(12) United States Patent
Ohno

(10) Patent No.: US 7,810,978 B2
(45) Date of Patent: Oct. 12, 2010

(54) SPREAD ILLUMINATING APPARATUS

(75) Inventor: Yasuo Ohno, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 122 days.

(21) Appl. No.: 12/004,061

(22) Filed: Dec. 20, 2007

(65) Prior Publication Data

US 2008/0192506 A1  Aug. 14, 2008

(30) Foreign Application Priority Data

Jan. 12, 2007  (JP) .............................. 2007-004546

(51) Int. Cl.
*F21V 8/00* (2006.01)

(52) U.S. Cl. ........................ 362/612; 362/613; 362/800; 362/606; 362/608

(58) Field of Classification Search ................. 362/612, 362/613, 800, 621, 622; 345/64; 359/599
See application file for complete search history.

(56) References Cited

U.S. PATENT DOCUMENTS

| | | | | |
|---|---|---|---|---|
| 6,065,848 A | * | 5/2000 | Tucker et al. ................ | 362/101 |
| 7,364,338 B2 | * | 4/2008 | Chang ......................... | 362/612 |
| 2008/0030650 A1 | * | 2/2008 | Kitagawa et al. .............. | 349/65 |
| 2008/0170415 A1 | * | 7/2008 | Han et al. .................... | 362/612 |
| 2008/0259641 A1 | * | 10/2008 | Suzuki et al. ................ | 362/612 |

FOREIGN PATENT DOCUMENTS

| JP | A 2001-43721 | 2/2001 |
|---|---|---|
| JP | A 2002-343122 | 11/2002 |

* cited by examiner

*Primary Examiner*—Anabel M Ton
(74) *Attorney, Agent, or Firm*—Oliff & Berridge, PLC

(57) ABSTRACT

A spread illuminating apparatus includes: a light conductor plate having a light inlet surface and a light outlet surface; a point light source disposed at the light inlet surface of the light conductor plate; and a light diffuser sheet disposed on the light outlet surface of the light conductor plate, wherein the light diffuser sheet has one end thereof extending beyond the light inlet surface and thereby covers at least a part of the point light source, whereby light which conventionally does not enter the light conductor plate directly from the light inlet surface is adapted to impinge on the light diffuser sheet and to fall incident on the light inlet surface and is efficiently utilized. A recess may be formed at the one end of the light diffuser sheet so as to expose a part of the light exit surface of the light conductor plate.

3 Claims, 7 Drawing Sheets

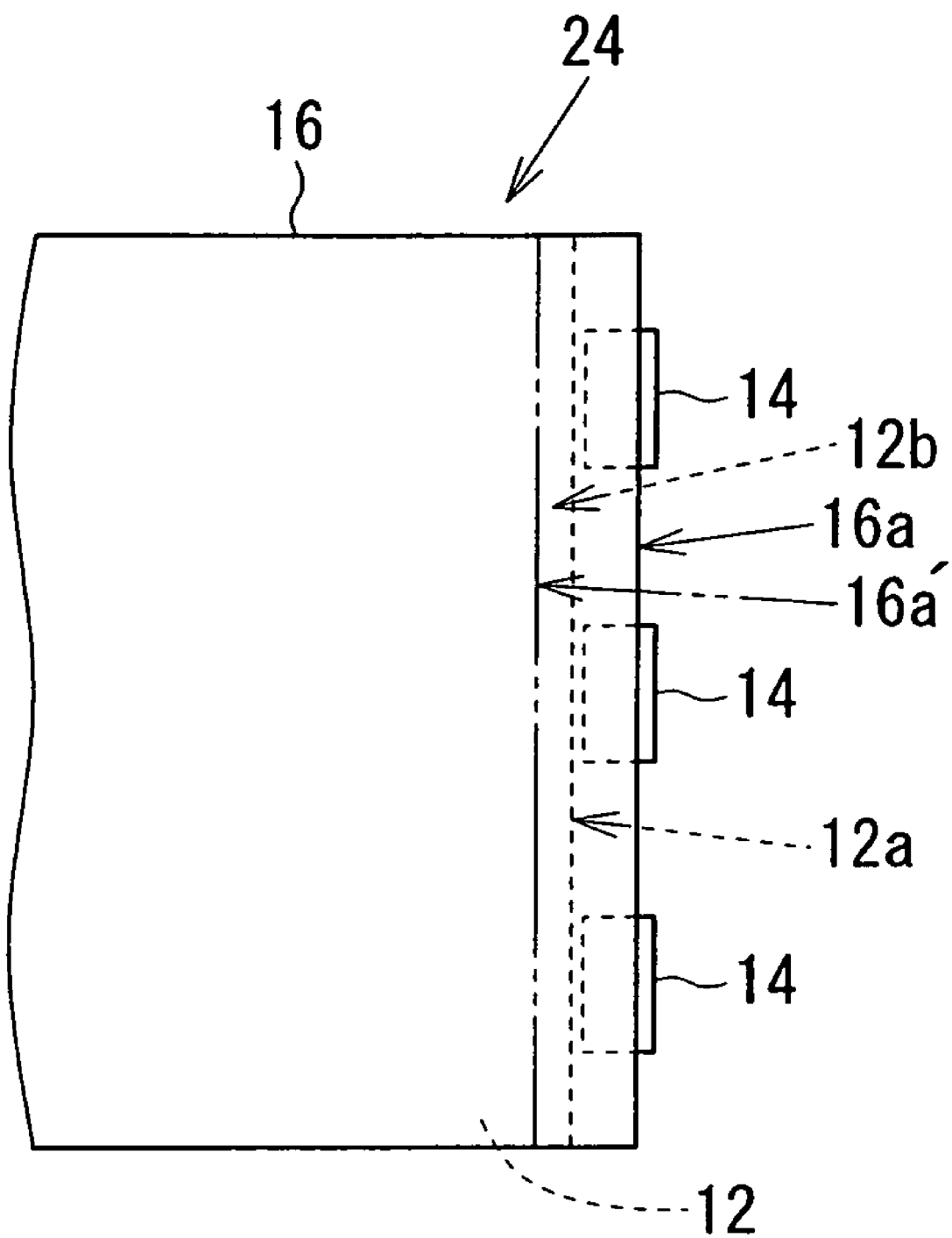

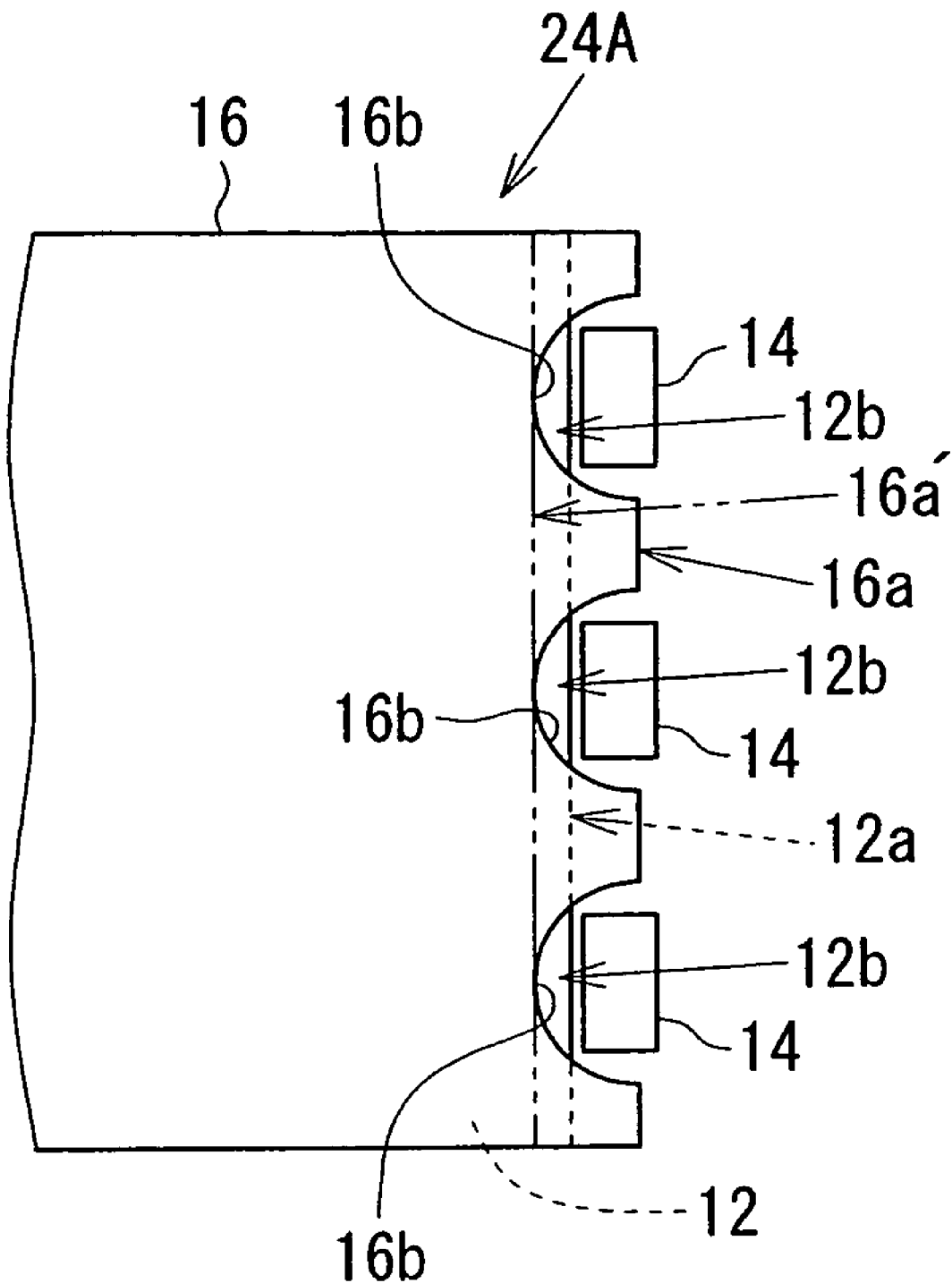

SPREAD ILLUMINATING APPARATUS

BACKGROUND OF THE INVENTION

1. Field of the Invention

The present invention relates to a side light type spread illuminating apparatus, and particularly to a spread illuminating apparatus for use as a lighting means of a liquid crystal display device.

2. Description of the Related Art

A liquid crystal display (hereinafter referred to as "LCD") device is extensively used as a display means in recent electronic devices. Since the LCD device does not emit light by itself, a lighting means is required in order to ensure visibility for use at night or in the dark. A spread illuminating apparatus has been used as the lighting means, and side light spread illuminating apparatus, which is one type of spread illuminating apparatus, is prevailing.

The side light type spread illuminating apparatus basically includes a light conductor plate having light transmitting property, and a line light source or one or more point light sources disposed at a side of the light conductor plate. The side light type spread illuminating apparatus is increasingly applied in a small electronic device, such as a mobile information terminal, and therefore preferably incorporates a point light source which enables simplification of a driving circuit.

FIG. 5 shows a conventional spread illuminating apparatus 10 incorporating a point light source. The spread illuminating apparatus 10 includes a light conductor plate 12, and a light emitting diode (LED) 14 as a point light source disposed close to a light inlet surface 12a of the light conductor plate 12, wherein the number of the LED 14 is determined according to the brightness required for the apparatus 10 and the area of the light conductor plate 12. The spread illuminating apparatus 10 further includes a light diffuser sheet 16 disposed on a light outlet surface 12b of the light conductor plate 12, and a prism sheet 18 disposed to cover the light diffuser sheet 16. Also, where appropriate, a polarized reflection plate (not shown) may be disposed to cover the light diffuser sheet 16, and a light reflector sheet (not shown) may be disposed at a major surface of the light conductor plate 12 opposite to the light outlet surface 12b. And, an aluminum case 20 is placed over the major surface of the light conductor plate 12 opposite to the light outlet surface 12b, while a frame-like metal case 22 is placed over the prism sheet 18 (toward the light outlet surface 12b).

The aforementioned optical sheets, specifically the light diffuser sheet 16, the prism sheet 18, and the polarized reflection sheet (not shown) are provided for the purpose of enhancing and uniforming the brightness and adjusting the viewing angle at the light outlet surface 12b of the light conductor plate 12 of the spread illuminating apparatus 10 (refer to, for example, Japanese Patent Applications Laid-Open Nos. 2002-343122 and 2001-43721), and the area size of the optical sheets is determined to be smaller than the area of the light outlet surface 12b of the light conductor plate 12 to just cover the effective surface area of the light conductor plate 12 contributing to illumination and at the same time determined to be slightly larger than the window area of the frame-like metal case 22 thereby prohibiting the edge portions thereof from being visible.

It has been demanded for the spread illuminating apparatus to be maximally reduced in size and to achieve the highest possible brightness. Under such the circumstances, in order to increase the effective surface area contributing to illumination without increasing the entire dimension of the spread illuminating apparatus 10 (that is to say, in order to reduce the non-effective area), a rim portion 22a of the frame-like metal case 22 is desired to be narrowed. The rim portion 22a, when narrowed, leads to a decreased overlap margin with the optical sheets (the light diffuser sheet 16, the prism sheet 18, and the like), and it is possible that when the optical sheet shrinks due to heat, the rim edge of the optical sheet is visible raising an aesthetic defect. Consequently, it is essential that the optical sheets, especially the light diffuser sheet 16 disposed closest to the LEDs 14 emitting heat, be sized and attached with a great care when the rim portion 22a of the frame-like metal case 22 is narrowed.

Also, when the rim portion 22a of the frame-like metal case 22 is narrowed, the distance is decreased between the LED 14 and the window edge of the frame-like metal case 22 thus constituting a disadvantage in the effort to handle the problem that the brightness is notably higher in front of the LED 14 (hot spot), and further stringent countermeasures are required to deal with the hot spot problem.

SUMMARY OF THE INVENTION

The present invention has been made in light of the above circumstances, and it is an object of the present invention to provide a side light type spread illuminating apparatus incorporating a point light source, in which brightness uniformity is facilitated while downsizing and brightness enhancement are ensured and in which the aesthetic defect that the edge of the optical sheet is visible is corrected.

In order to achieve the object, according to an aspect of the present invention, a spread illuminating apparatus includes: a light conductor plate having a light inlet surface and a light outlet surface; a point light source disposed at the light inlet surface of the light conductor plate; and a light diffuser sheet disposed on the light outlet surface of the light conductor plate, wherein the light diffuser sheet has one end thereof extending beyond the light inlet surface and thereby covers at least a part of the point light source.

In the aspect of the present invention, a recess may be formed at the one end of the light diffuser sheet so as to expose a part of the light outlet surface of the light conductor plate.

In the aspect of the present invention, the spread illuminating apparatus may further include a light reflector member disposed to cover the recess of the light diffuser sheet.

And, in the aspect of the present invention, the light reflector member may be constituted by a frame-like metal case to cover the periphery of the light diffuser sheet.

BRIEF DESCRIPTION OF THE DRAWINGS

FIG. 1 is a schematic top plan view of a relevant portion of a spread illuminating apparatus according to a first embodiment of the present invention, wherein a positional relation between a light conductor plate, point light sources disposed at a light inlet surface of the light conductor plate, and a light diffuser sheet disposed on a light outlet surface of the light conductor plate;

FIG. 2 is a schematic top plan view of a relevant portion of a spread illuminating apparatus according to a second embodiment of the present invention, wherein a positional relation between a light conductor plate, point light sources disposed at a light inlet surface of the light conductor plate, a light diffuser sheet disposed on a light outlet surface of the light conductor plate, and recesses of the light diffuser sheet;

DETAILED DESCRIPTION OF THE INVENTION

Figure 5:
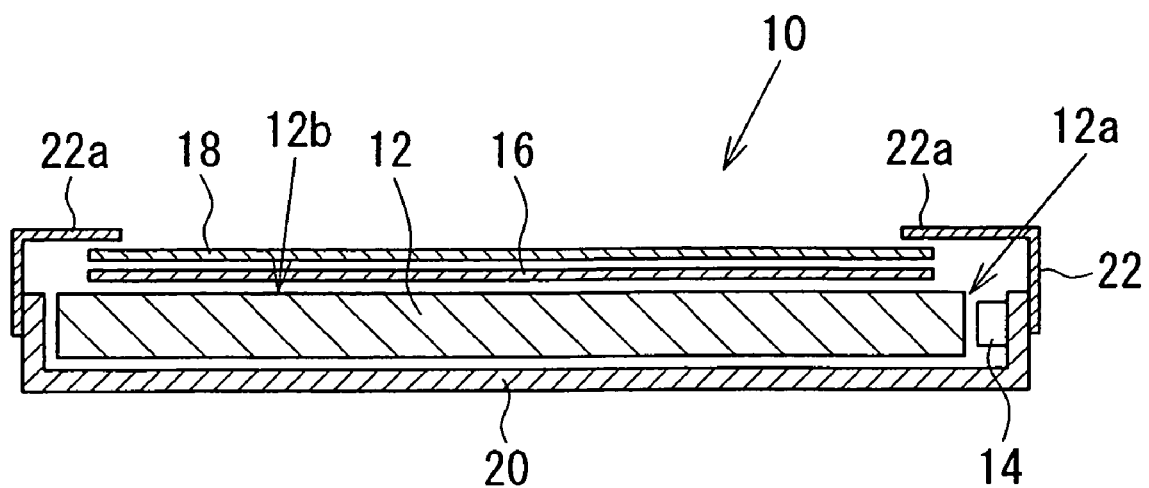
FIG. 5 is a cross sectional view of a conventional spread illuminating apparatus incorporating a point light source.

Exemplary embodiments of the present invention will hereinafter be described with reference to the accompanying drawings. In explaining the embodiments of the present invention, any component parts corresponding to those of the conventional apparatus shown in FIG. 5 are denoted by the same reference numerals, and a detailed description thereof will be omitted below. In this connection, the entire structure according to the present invention is basically the same as that of the conventional apparatus 10 of FIG. 5, and FIG. 5 will also be referred to as appropriate.

A first embodiment of the present invention will be described with reference to FIG. 1. A spread illuminating apparatus 24 shown in FIG. 1 according to the first embodiment includes a light conductor plate 12, LEDs 14 as point light sources disposed close to a light inlet surface (indicated by a dotted line) 12a of the light conductor plate 24, and a light diffuser sheet 16 disposed on a light outlet surface 12b of the light conductor plate 24, wherein an end 16a of the light diffuser sheet 16 located toward the light inlet surface 12a extends beyond the light inlet surface 12a and is positioned above the LEDs 14. The spread illuminating apparatus 24 further includes a frame-like metal case 22 with a rim portion 22a, though not shown in FIG. 1 (refer to FIG. 5). The light inlet surface 12a of the light conductor plate 12, though partly provided with prisms, is planar as a whole, and the LEDs 14 are disposed to face the light inlet surface 12a. For reference purpose, FIG. 1 shows an imaginary line (chained line) to indicate the location of an end 16a' of the light diffuser sheet 16 of the conventional spread illuminating apparatus 10 of FIG. 5.

In the spread illuminating apparatus 24 described above, the diffuser sheet 16 has its end 16a extended toward the LED 14 and therefore secures a comfortable overlap margin with the rim portion 22a of the frame-like metal case 22 (not shown in FIG. 1; refer to FIG. 5), even if the rim portion 22 is narrowed. Consequently, even when the light diffuser sheet 16 is caused to shrink due to heat, it is securely prevented from happening that the end 16a of the light diffuser sheet 16 is visible through the window of the frame-like metal case 22.

Also, since the end 16 of the light diffuser sheet 16 extends beyond the light inlet surface 12a of the light conductor plate 12 so as to be located above the LED 14, light emitted from the LED 14 but failing to enter the light conductor plate 12 immediately through the light inlet surface 12a impinges on the light diffuser sheet 16 and changes its traveling direction so as to fall incident on the light inlet surface 12a. Thus, the light which does not contribute to illumination at the light conductor plate in the conventional spread illuminating apparatus 10 of FIG. 5 is effectively utilized thereby enhancing the brightness (actual measurement shows a 3% improvement compared with the conventional art).

Figure 3A:
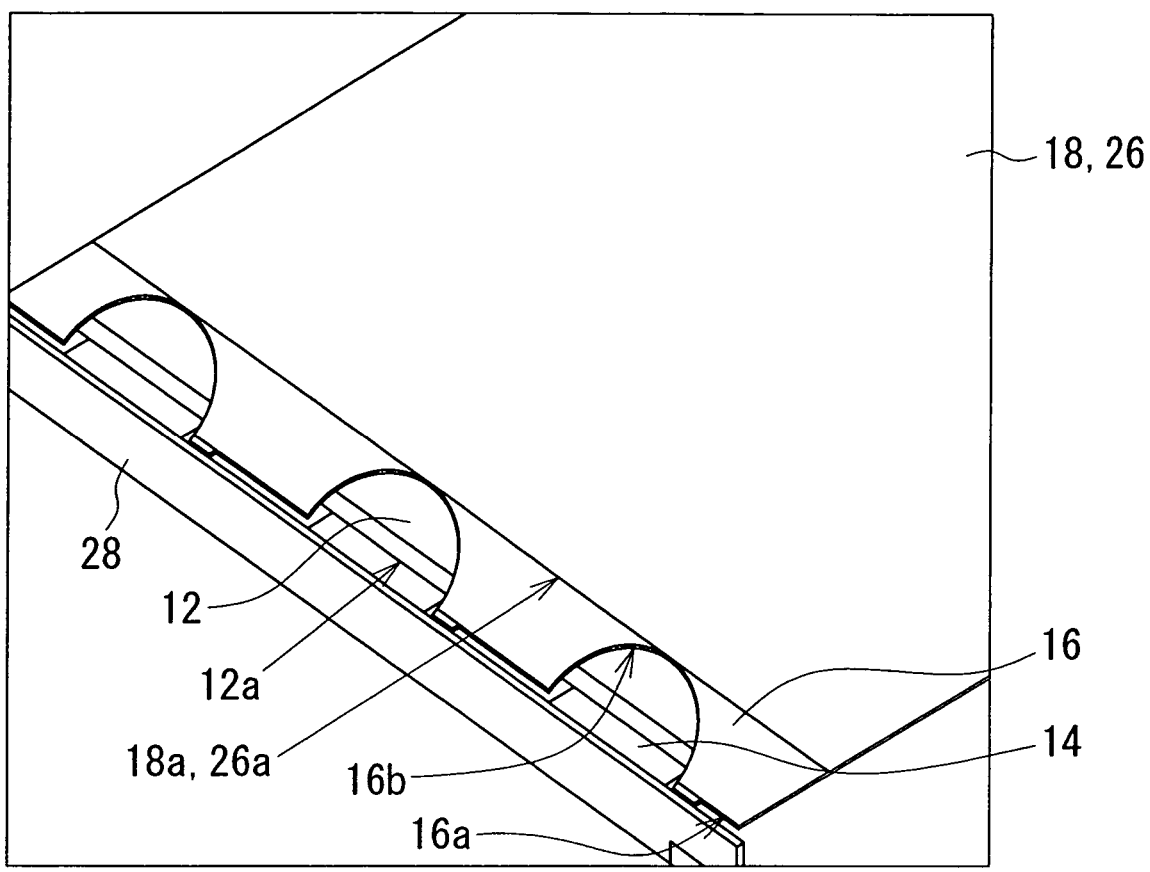
FIG. 3A is a perspective view of the relevant portion of FIG. 2 (a printed board is additionally shown), seen from the direction of the light outlet surface of the light conductor plate.
Figure 3B:
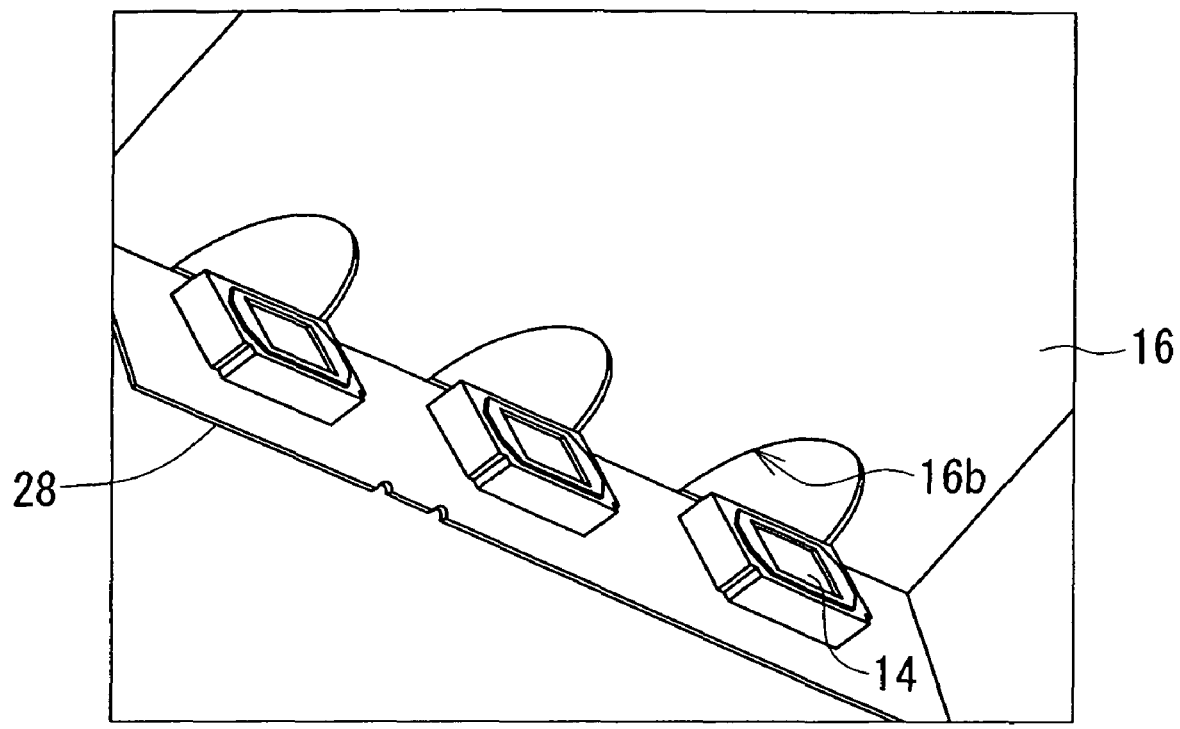
FIG. 3B is another perspective view of the relevant portion of FIG. 2 (the light conductor plate is omitted), seen from a direction opposite to the viewing direction of FIG. 3A.
Figure 4A:
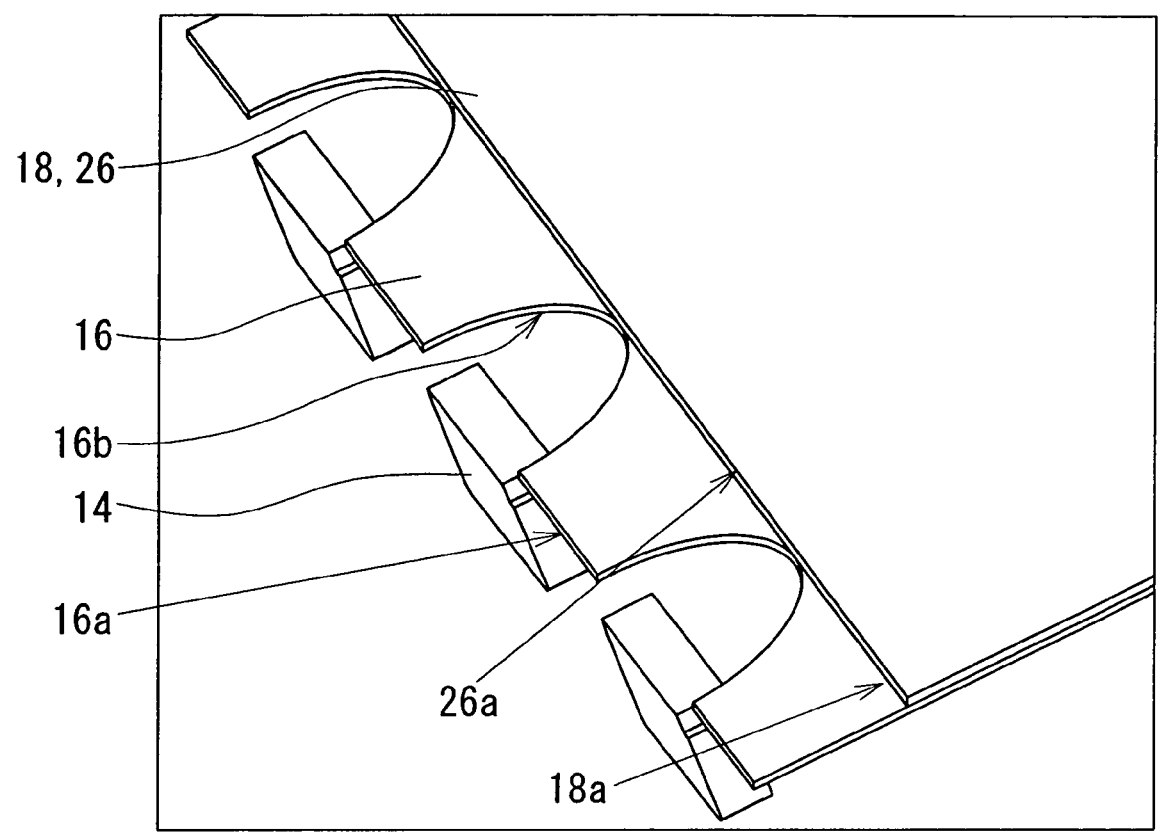
FIG. 4A is still another perspective view of the relevant portion of FIG. 2, omitting the printed board and the light conductor plate.
Figure 4B:
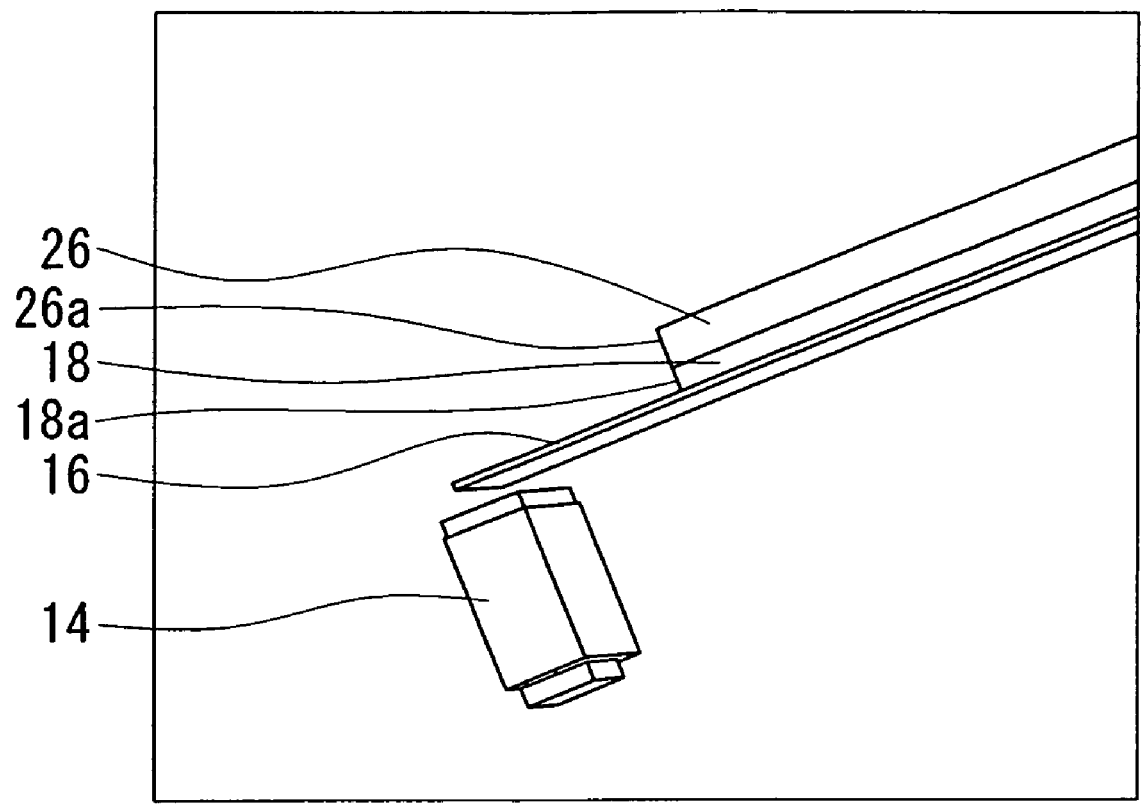
FIG. 4B is a view of the relevant portion of FIG. 4A, seen from a different viewing angle and showing only one point light source.

A second embodiment of the present invention will be described with reference to FIGS. 2 to 4A and 4B. A spread illuminating apparatus 24A shown in FIG. 2 according to the second embodiment is structured basically the same as the spread illuminating apparatus 24 of FIG. 1 according to the first embodiment further including a frame-like metal case 22 with a rim portion 22a (not shown in the relevant figures; refer to FIG. 5) but differs therefrom in that a light diffuser sheet 16 has recesses 16b formed at an end 16a thereof and located corresponding to respective LEDs 14. Referring to FIGS. 3A, 3B and 4A as well as FIG. 2, the recess 16b is shaped semicircular so as to expose a part of a light outlet surface 12b of a light conductor plate 12, and has its radius set to entirely expose the LED 14 (the LEDs 14 in FIGS. 3A and 3B are shown to be mounted on a printed board 28), and referring to FIGS. 3A and 4A, the crown of the semicircular recess 16b passes beyond a light inlet surface 12a of the light conductor plate 12 and reaches an end 18a of a prism sheet 18 and an end 26a of a polarized reflection sheet 26 (the prism sheet 18 and the polarized reflection sheet 26 are disposed on the light diffuser sheet 16 as shown in FIG. 4B). The recess 16b does not necessarily have to be semicircular (constant curvature) but may alternatively be shaped semielliptical or semipolygonal.

In the spread illuminating apparatus 24A according to the second embodiment, like the spread illuminating apparatus 24 according to the first embodiment, the light diffuser sheet 16 has its end 16a extended toward the LED 14 and therefore secures a comfortable overlap margin with the rim portion 22a of the frame-like metal case 22 (not shown in the relevant figures; refer to FIG. 5), even if the rim portion 22a is narrowed. Consequently, even when the light diffuser sheet 16 is caused to shrink due to heat, it is securely prevented from happening that the end 16a of the light diffuser sheet 16 is visible through the window of the frame-like metal case 22.

Also, since the recess 16b provided at the end 16a of the light diffuser sheet 16 is formed so as to expose the entire part of the LED 14 and a part of the light outlet surface 12b of the light conductor plate 12, light, which is emitted from the LED 14, fails to be incident directly on the light inlet surface 12a, and which travels forward, has its traveling direction changed not by the diffuser sheet 16 having a light disusing effect but by the rim portion 22a of the frame-like metal case 22 functioning as a light reflector member, enters the light conductor plate 12 from the exposed part of the light outlet surface 12b located close to the light inlet surface 12a, changes its optical path at a light diffusing pattern formed at the light outlet surface 12b or the opposite surface of the light conductor plate 12 while traveling farther in the light conductor plate 12, and exits from the light outlet surface 12b as an effective illumination light. Thus, the light, which travels forward from the LED 14 and does not enter directly the light conductor plate 12, is adapted to exit from the whole area of the light outlet surface 12b in a uniform manner instead of exiting in a concentrated manner from an specific area of the light outlet surface 12b located in front of the LED 14, whereby the hot spot is maximally avoided ensuring that the brightness distribution is improved while the brightness is enhanced over the entire effective illumination area.

Accordingly, in the side light type spread illuminating apparatus 24/24A incorporating the LEDs (point light sources) 14, brightness uniformity is facilitated while downsizing and brightness enhancement are ensured.

The spread illuminating apparatuses 24 and 24A structured as described above are suitably applicable to a car navigation system and the like with a relatively large display, and also a mobile phone and the like with a small display.

While the present invention has been illustrated and explained with respect to specific embodiments thereof, it is to be understood that the present invention is by no means limited thereto but encompasses all changes and modifications with replacements, deletions or additions that will become possible within the scope of the appended claims.

What is claimed is:

1. A spread illuminating apparatus comprising:
a light conductor plate having a light inlet surface and a light outlet surface;
a point light source disposed at the light inlet surface of the light conductor plate; and
a light diffuser sheet disposed on the light outlet surface of the light conductor plate, one end of the light diffuser sheet extending beyond the light inlet surface and having a recess at the one end of the light diffuser sheet so as to expose the entire point light source and a part of the light outlet surface of the light conductor plate.

2. A spread illuminating apparatus according to claim 1, further comprising a light reflector member covering the recess of the light diffuser sheet.

3. A spread illuminating apparatus according to claim 2, wherein the light reflector member is a frame-like metal case that covers a periphery of the light diffuser sheet.

* * * * *